United States Patent Office 3,150,266
Patented Sept. 22, 1964

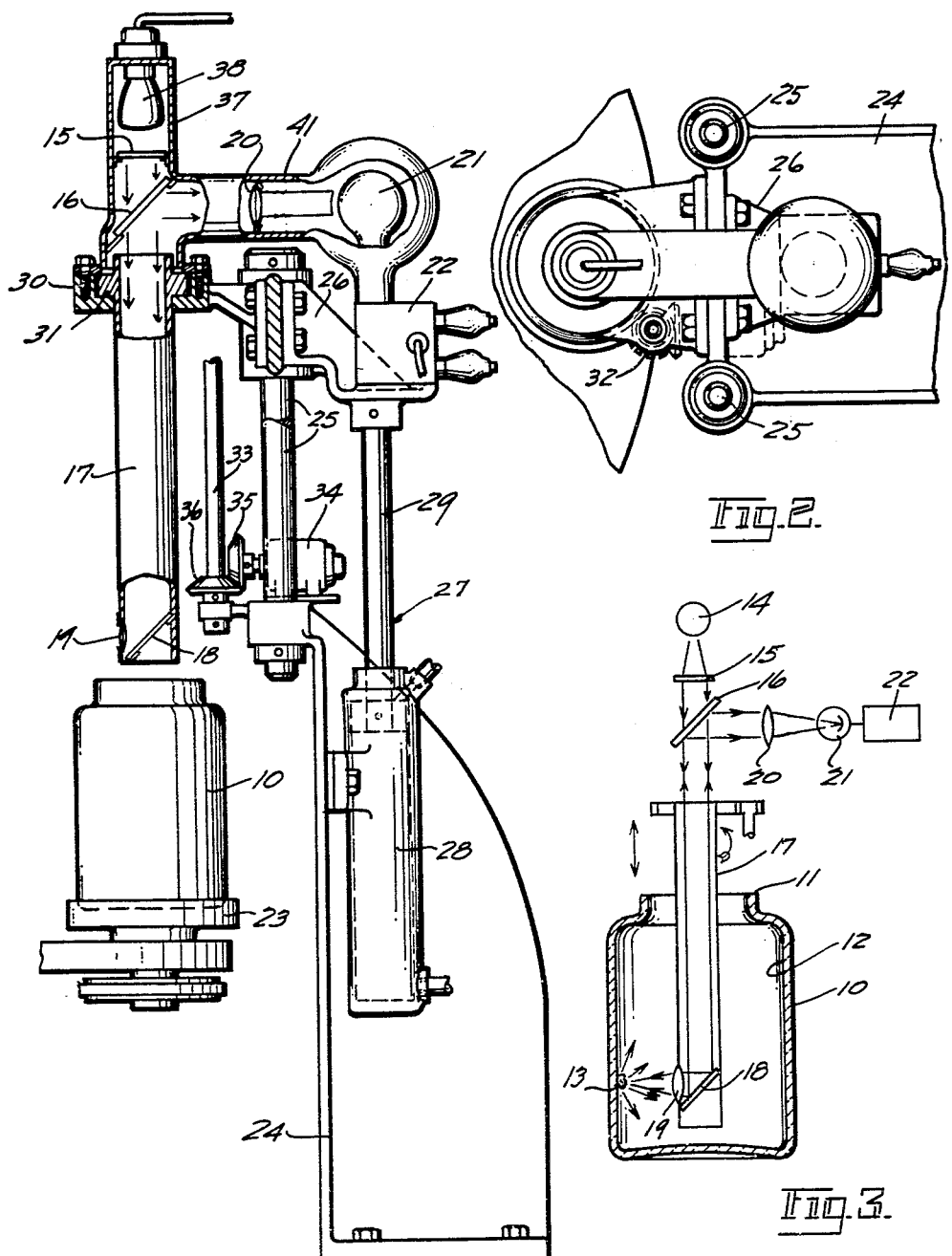

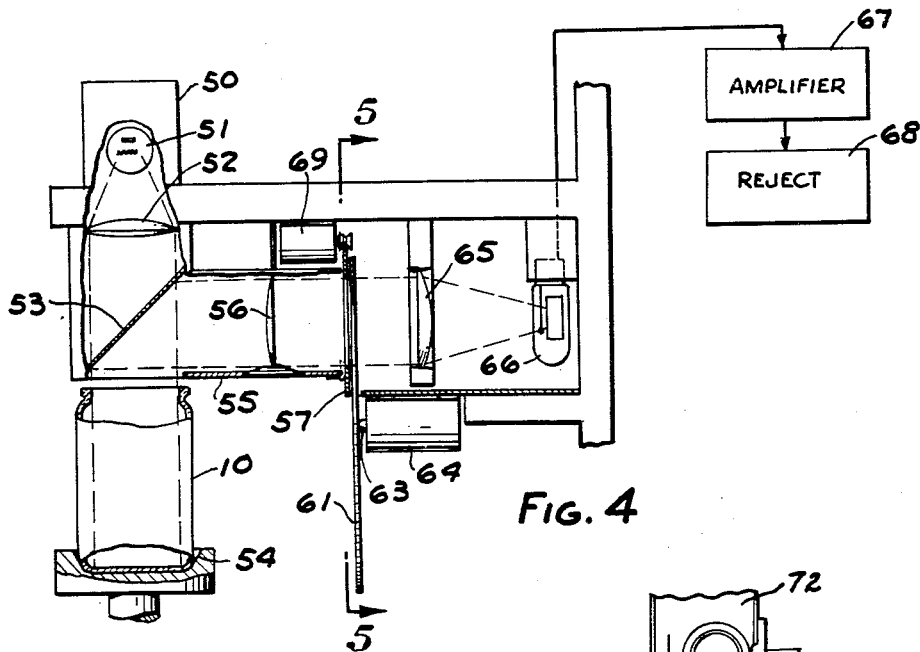
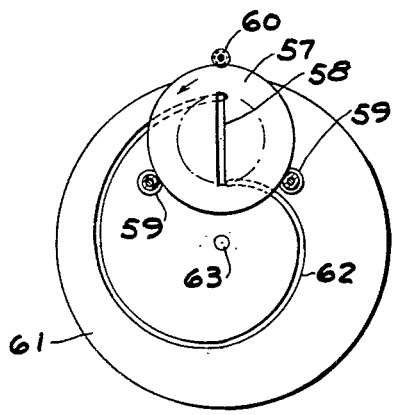
FIG. 5
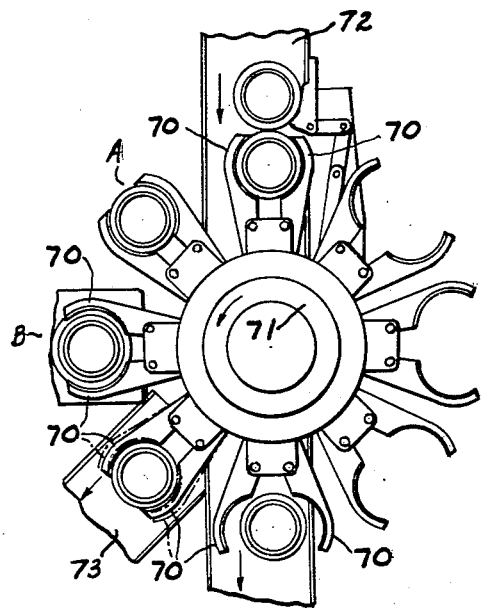
FIG. 6

3,150,266
INSPECTING INTERIOR WALL SURFACES
OF CONTAINERS
Benny B. Mathias, Toledo, Ohio, assignor to Owens-Illinois Glass Company, a corporation of Ohio
Filed Feb. 13, 1961, Ser. No. 89,333
13 Claims. (Cl. 250—224)

This invention relates to inspecting interior wall surfaces of open mouth containers and particularly to a method annd apparatus for inspecting the interior wall surfaces of open mouth glass containers in order to detect surface flaws or similar imperfections.

In the manufacture of containers from glass or similar materials, the interior wall surfaces thereof sometimes have surface defects in the form of particles, fragments and the like, sometimes termed "spikes." Such defects occur occasionally and cannot be avoided with the commonly used methods of forming the glass containers. Obviously, a close inspection of the interiors of the containers is essential in order that such containers can be detected and will not be transmitted for use.

It is therefor an object of this invention to provide a method and apparatus for quickly and easily inspecting the interior wall surfaces of open mouth containers; to provide such a method and apparatus which is reliable; to provide such a method and apparatus which can be used safely in a manufacturing plant without undue care and maintenance.

In the drawings:

FIG. 1 is a part sectional elevation of an apparatus embodying the invention.

FIG. 2 is a fragmentary plan view of the same.

FIG. 3 is a diagrammatic showing of the method and apparatus.

FIG. 4 is a part sectional, partly diagrammatic elevation of another apparatus embodying the invention.

FIG. 5 is a sectional view taken along the line 5—5 in FIG. 4.

FIG. 6 is a plan view of an article handling machine utilized in connection with the apparatus shown in FIGS. 1 and 4.

Referring to FIG. 3, according to the invention, the container 10 which is to be inspected is formed with an open mouth 11 and is herein shown as being generally cylindrical. The interior wall surface 12 should be smooth but may occasionally be formed with surface imperfections or other defects 13, in which case, the container should be rejected.

According to the invention, radiation from a source of radiant energy such as lamp 14, which emits radiation having a wave length below that to which the material of the container 10 is transparent, is condensed into a beam by quartz lens 15 and directed through a one-way quartz mirror 16 downwardly through a tube 17 extending through the open mouth 11 of container 10 along the axis of the container 10. A mirror 18 in the lower end of the tube 17 redirects the light beam at a right angle to the axis of the tube 17 and the container 10 toward the interior wall surface 12 of the container 10. A quartz lens 19 in the lower end of the tube focuses the beam into a spot or small area onto the interior wall surface 12 of the article 10.

Since the radiation has a wave length below that to which the material of the container is transparent, it will not be transmitted through the container. A portion of the radiation will normally be reflected by wall surface 12 back through the lens 19 onto the mirror 18, reflected upwardly to mirror 16 and then through a quartz lens 20 to a photoelectric cell 21. Photoelectric cell 21 is only sensitive to such radiation, that is, sensitive to a wave length below that to which the material of the container is transparent.

In testing glass containers, the radiation from source 14 has a wave length of not more than 3100 Angstroms and the photoelectric cell is sensitive to radiation having a wave length of 3100 Angstroms or shorter.

As the spot is directed against the interior wall surface 12, a relative rotation is produced between the spot of light and the interior wall surface 12 about the axis of the container and a simultaneous relative movement between the spot of light and the interior wall surface 12 is produced in a direction parallel to the axis of the container so after a short period of time of such relative rotation the entire interior wall surface is scanned by the spot of radiation.

If the spot of radiation strikes a flaw 13 the amount of radiation redirected to the photo-cell is reduced and the photoelectric cell then produces a signal which is amplified by amplifier 22 and caused to actuate a signal or a rejecting mechanism for rejecting the container 10.

The apparatus for producing the relative movements between the spot of light and the wall surface of the container is shown in FIGS. 1 and 2 and comprises a support 23 for the container 10 and a base 24 having horizontally spaced vertical posts 25 mounted thereon. A carriage 26 is mounted on the posts 25 for vertical reciprocating movement. The controlled movement of the carriage 26 is produced by a hydraulic piston motor 27 which has its cylinder 28 mounted on the base 24 and its piston 29 fixed to the carriage 26 so that when fluid is supplied to the piston motor, the piston rod 29 is moved upwardly and downwardly to reciprocate the carriage 26 vertically and move tube 17 into and out of container 10, thereby causing the spot of radiation to move along the wall surface 12 in a direction parallel to the axis of the container 10.

Tube 17 is rotatably mounted on an extension 30 of carriage 26 and is formed with an integral gear 31 on the upper end thereof which meshes with a pinion 32 journalled in the carriage 26. A shaft 33 is journalled on the base 24 and passes upwardly through the pinion 32 and is connected thereto by a spline connection so that the pinion 32 can be moved axially on the shaft 33 while maintaining a driving connection therebetween. The shaft 33 is driven by an electric motor 34 through bevel gears 35, 36. When shaft 33 is rotated, tube 17 is rotated to rotate the spot of rotation relative to the internal surface 12 of the container about the axis of the container.

A housing 37 is mounted on the carriage 26 and supports the source 14 of radiation and condensing lens 15 in overlying relationship to the end of the tube 17. One-way mirror 16 is positioned in the path of the beam formed by the lens 15 with its plane at 45° to the axis of the beam. Housing 37 includes an integral extension 41 which supports lens 20 and provides an open path to photoelectric cell 21. Amplifier 22 is mounted on the carriage 26.

By the above arrangement, the relative rotation between the spot of radiation and the interior wall surface of the container 10 is obtained by energizing electric motor 34 to cause a rotation of the tube 17. Relative movement of the spot on the interior wall surface in a direction parallel to the axis of the container is achieved by actuating motor 28 to cause the tube 17 to move upwardly or downwardly relative to the container 10.

Inasmuch as the radiation which is used has a wave length below that at which the material of the container 10 is transparent, no radiation caused by reflection either from indentations or other formations on the exterior of the container will be transmitted to the inspecting apparatus. In addition, it is not essential that the housing 37 be light tight because normal light, that is, light other than ultra-violet, will not affect the photoelectric cell 21 which is only sensitive to radiation below that of which the material of the container is transparent.

The apparatus shown in FIG. 1 can also be operated by slight modification in the manner of the apparatus shown in FIG. 3, that is, by mounting housing 37 in fixed position and having the tube 17 only movable upwardly and downwardly relative to the container 10. In this manner, the spot is focused on the side wall of the container 10 regardless of the position of the rotating tube 17. This is achieved because the light beam traveling from the lens 15 to the mirror 18 and lens 19 is collimated. Since the light rays are parallel, the varying distance between the lens 15 and mirror 18 caused by the upward and downward movement of the tube 17, does not affect the focus of the light beam on the wall of the container.

The method and apparatus shown and described in FIGS. 1 to 3 is intended to detect flaws in the side walls of the internal surface of the container. In order to detect flaws in the bottom wall of the container, the method and apparatus shown in FIGS. 4 and 5 is used. In this apparatus, the bottom wall is illuminated by a collimated beam of radiant energy which emits radiation having a length below that to which the material in the container is transparent, an image of the bottom wall is scanned and any change in brightness or illumination of the image is detected. Such a change indicates a flaw in the bottom wall and the container can then be rejected.

Referring to FIG. 4, the inspecting station comprises a housing 50 which is supported above the inspecting station and comprise a source of radiant energy such as lamp 51 which emits radiation having a wave length below that to which the material of the container 10 is transparent, that is, a wave length of not more than 3100 Angstroms. The radiation from lamp 51 is condensed into a collimated beam by lens 52 and is directed through a one-way mirror 53, such as a half-silvered mirror, downwardly through the open mouth 11 of the container 10 along the axis of the container 10 to illuminate the bottom wall 54 of the container.

Since the radiation has a wave length below that to which the material of the container is transparent, it will not be transmitted through the container. The illuminated bottom wall 54 of the container 10 is viewed, that is, an image of the container is reflected by mirror 53 through lens 56 in tubular extension 55 of housing 50 onto the plane of a scanning disc 61. A disc 57 of smaller diameter having a diametral slot 58 substantially equal to the diameter of the image of the bottom wall of the container 10 is mounted by rollers 59, 60 in front of the disc 61, the roller 60 being driven by a motor 69 to rotate the disc 57 in a counterclockwise direction as viewed in FIG. 5. Disc 61 is provided with a spiral slot 62 so that upon rotation of the disc 61, a spiral slot scans the image focused thereon across a diameter. Disc 61 is mounted on a shaft 63 driven by a motor 64. Combined rotation of the disc 61 and disc 57 causes the image to be scanned along various diameters. Where the slots 58, 62 overlap, a portion of the image is permitted to pass to a lens 65 that focuses the light onto an ultra-violet photocell 66. As the image is being scanned, any defect in the bottom wall will be evidenced by a diminution or lessening in the brightness of the image. This lessening in the brightness is sensed by the cell 66 producing a signal which can be amplified in an amplifier 67 and caused to energize a reject mechanism 68.

It can thus be seen that the combined use of the methods and apparatus shown in FIGS. 1 to 3 and 4 to 5, the side and bottom walls of the container are inspected for flaws.

The mechanisms can be combined in a single machine wherein the containers 10 are successively removed from one station and delivered to another where they are supported so that they can be scanned by the appropriate mechanism. Suitable apparatus is shown in the patent to Fedorchak et al. 2,682,802, which comprises a plurality of jaws 70 mounted on a turret 71 adapted to selectively engage a container and move it from conveyor 72 to stations in succession as shown in FIG. 6. At each station, the jaws open to release the containers for inspection. A rejection conveyor 73 can be provided. The inspection apparatus can be positioned at the inspection stations. For example, the apparatus of FIGS. 1–3 can be at station A, while the apparatus of FIGS. 4 and 5 can be at station B.

This application is a continuation-in-part of application Serial No. 785,592, filed January 8, 1959, now abandoned, for Inspecting Interior Wall Surfaces of Containers.

I claim:

1. The method of inspecting the interior wall surface of an open mouth transparent container which comprises projecting a collimated beam of radiation from a source of radiant energy which emits radiation having a wave length below that to which the material of the container is transparent, directing the collimated beam through the open mouth of the container against an interior wall surface of the container, causing a part of said beam to be reflected by said wall surface, successively viewing portions only of said wall surface while simultaneously illuminating said portions, and causing a flaw at said wall surface to reflect the radiation out of the normal viewing path and thereby diminish the amount of radiation directed in the viewing path.

2. The method of inspecting the interior wall surface of an open mouth transparent container which comprises projecting a collimated beam of radiation from a source of radiant energy which emits radiation having a wave length below that to which the material of the container is transparent, directing the collimated beam through the open mouth of the container against a wall surface of the container, successively viewing portions only of said wall surface exterior of said container while it is illuminated causing a part of the light to be reflected from the illuminated portion of the wall surface and directed to a photoelectric cell sensitive to the radiation having a wave length below that to which the material of the container is transparent, and causing a flaw at said wall surface to reflect the radiation out of the normal path to said photoelectric cell and thereby diminish the amount of radiation directed to said photoelectric cell to produce an electric impulse.

3. The method of inspecting the interior wall surface of an open mouth transparent container which comprises projecting a collimated beam of radiation from a source of radiant energy which emits radiation having a wave length below that to which the material of the container is transparent, directing the collimated beam through the open mouth of the container along the axis of the container against substantially the entire bottom wall surface of the container, forming an image of the bottom wall of the container, successively scanning portions of said image, and producing a signal when any successive portion of the image is diminished in brightness.

4. The method of inspecting the interior wall surface of an open mouth transparent container which comprises projecting a collimated beam of radiation from a source of radiant energy which emits radiation having a wave length below that to which the material of the container is transparent, directing the collimated beam through the open mouth of the container along the axis of the container against substantially the entire bottom wall surface of the container, forming an image of the bottom wall of the container, successively scanning portions of said image, directing said successive portions of the image to a photoelectric cell, and causing said photoelectric cell to produce a signal when the brightness of any portion of the image is substantially diminished.

5. An apparatus for inspecting the interior wall surface of an open mouth container comprising a support for the container, a source of radiant energy mounted in fixed position exteriorly of said container, said source providing radiation having a wave length below that to which the material of the container is transparent, means for condensing and collimating a beam of radiation from said source and directing the collimated beam to the open mouth of the container onto an interior wall surface of the container, means for scanning successive portions of said interior wall surface while they are being illuminated, a photoelectric cell mounted exteriorly of said container, and means for directing the radiation normally reflected by said wall surface to said photoelectric cell, said photocell being sensitive to radiation having a wave length below that to which the material of the container is transparent, thereby energizing the cell when a flaw in the wall surface reflects a portion of said radiation out of the path to said photocell and thereby lessens the radiation normally passing to said photocell.

6. An apparatus for inspecting the interior wall surface of an open mouth container comprising a support for the container, a source of radiant energy mounted in fixed position exteriorly of said container, said source providing radiation having a wave length below that to which the material of the container is transparent, means for condensing and collimating a beam of radiation from said source and directing the beam to the open mouth of the container onto an interior wall surface of the container, a photoelectric cell mounted exteriorly of said container, and means for directing the radiation normally reflected by said wall surface to said photoelectric cell, said photocell being sensitive to radiation having a wave length below that to which the material of the container is transparent, means in the path of said reflected radiation to said photocell for creating an image of the portion of the container which is illuminated, and means interposed between the plane of the image and the photocell for scanning successive portions of the image.

7. The combination set forth in claim 6 wherein said image scanning means comprises a first disc having a diametral slot therein, a second disc having a spiral slot therein, means for rotatably mounting each said disc at the plane of the image and in the path thereof with the diametral slot of said first disc intersecting and overlying the spiral slot of said second disc.

8. The method of inspecting the interior wall surface of an open mouth transparent container which comprises projecting a collimated beam of radiation from a source of radiant energy which emits radiation having a wave length below that to which the material of the container is transparent, directing the collimated beam through the open mouth of the container along the axis of the container, redirecting the beam at a right angle to the axis of the container toward the side wall surface, thereafter focusing the beam to a small spot on the wall surface, causing a relative rotation of said surface and spot about the axis of the container and a simultaneous relative movement of said surface and said spot in a direction parallel with the axis of the container, thereby scanning said wall surface with said spot, causing a portion of the beam to be normally reflected from said wall surface to a photoelectric cell sensitive to radiation having a wave length below that to which the material of the container is transparent, and causing a flaw at said surface to reflect a part of said radiation in a path away from said photoelectric cell, thereby producing an electrical impulse.

9. The method of inspecting the interior wall surface of an open mouth glass container which comprises projecting a collimated beam of radiation from a source of radiant energy having a wave length of 3100 Angstroms or shorter, directing the collimated beam through the open mouth of the container along the axis of the container, redirecting the beam at a right angle to the axis of the container toward the side wall surface, thereafter focusing the beam to a small spot on the wall surface causing a relative rotation of said surface and spot about the axis of the container and a simultaneous relative movement of said surface and said spot in a direction parallel with the axis of the container, thereby scanning said wall surface with said spot, causing a portion of the beam to be normally reflected from said wall surface to a photoelectric cell sensitive to radiation having a wave length shorter than 3100 Angstroms, and causing a flaw at said surface to reflect a part of said radiation in a path away from said photoelectric cell, thereby producing an electrical impulse.

10. An apparatus for inspecting the interior wall surface of an open mouth container comprising a support for said container, a source of radiation mounted in fixed position exteriorly of said container, said source providing radiation having a wave length below that to which the material of the container is transparent, means for condensing and collimating a beam of radiation from said source and directing the collimated beam through the open mouth of the container in a direction aligned with the axis of the container, means adapted to be moved within said container for redirecting said beam and producing a spot of light on the inner side wall surface of the container, means for causing a relative rotation between said surface and said latter means about the axis of said surface and a simultaneous relative movement between said surface and said latter means in a direction parallel with said axis thereby causing the spot of light to scan said surface, a photoelectric cell mounted exteriorly of said container, said photoelectric cell being sensitive to radiation having a wave length below that to which the material of the container is transparent, and means for redirecting said light normally reflected from said side wall surface and directing it in a direction aligned with the axis of the container and opposite the direction of said beam into said container, and means in the path of said redirected reflected beam for directing said redirected reflected beam to said photoelectric cell, whereby all of said light is normally reflected to said photoelectric cell and a flaw at said surface diminishes the amount of radiation directed to the photoelectric cell and produces an electrical impulse.

11. An apparatus for inspecting the interior wall surface of an open mouth transparent container comprising a support for holding said container with its axis extending generally vertically and the open mouth thereof extending upwardly, a base, a source of radiation producing radiant energy having a wave length below that at which the material of the container is transparent, a carriage mounted for vertical reciprocating movement on said base, said lamp being mounted on said carriage, means mounted on said carriage for condensing and collimating a beam of radiation from said radiation source and directing the collimated beam downwardly into the open mouth of the container in a direction along the axis of the container, means mounted on said carriage for redirecting said collimated beam at a right angle after it has passed through the open mouth of the container, means for thereafter focusing said beam to produce a spot of radiation on the interior side wall surface of the container, means for reciprocating said carriage, means for causing relative rotation between said spot of light and said wall surface, a photoelectric cell mounted on said carriage exteriorly of the container, said photoelectric cell being sensitive to radiation having a wave length below that to which the material of the container is transparent, and means for redirecting said beam onto the wall surface of the container, said latter means redirecting the radiation reflected from said wall surface upwardly, and means on said carriage for redirecting said reflected radiation to said photo-cell, whereby normally all of the radiation reflected by the inner wall surface is redirected to said photoelectric cell and a flaw reflects some of said radiation out of the path of said redirecting means thereby lessening the amount of radiation directed to said photoelectric cell and creating an electrical impulse.

12. The combination as set forth in claim 11 wherein said means for causing relative rotation between said wall surface and said spot comprises means for rotating said redirecting means relative to said carriage.

13. An apparatus for inspecting the interior wall surface of an open mouth container comprising a support for holding said container with its axis extending generally vertically and the open mouth thereof extending upwardly, a base, a source of radiation producing radiant energy having a wave length below that at which the material of the container is transparent, a carriage mounted for vertical reciprocating movement on said base, said lamp being mounted on said carriage, means mounted on said carriage for condensing and collimating a beam of radiation from said radiation source and directing the collimated beam downwardly into the open mouth of the container in a direction along the axis of the container, a tube mounted on said carriage with its axis generally vertically in the path of said beam, means on said carriage for rotating said tube, means on the lower end of said tube for redirecting said collimated beam at a right angle, means on said tube for thereafter focusing said beam to produce a spot of radiation on the interior wall surface of the container, means for reciprocating said carriage, a photoelectric cell mounted on said carriage exteriorly of the container, said photoelectric cell being sensitive to radiation having a wave length below that to which the material of the container is transparent, and means for redirecting said beam onto the wall surface of the container, said latter means redirecting the radiation reflected from said wall surface upwardly, and means on said carriage for redirecting said reflected radiation to said photoelectric cell, whereby normally all of the radiation reflected by the inner wall surface is redirected to said photoelectric cell and a flaw reflects some of said radiation out of the path of said redirecting means thereby lessening the amount of radiation directed to said photoelectric cell and creating an electrical impulse.

References Cited in the file of this patent
UNITED STATES PATENTS

| | | |
|---|---|---|
| 2,405,483 | Abrams | Aug. 6, 1946 |
| 2,649,500 | Fedorchak | Aug. 18, 1953 |
| 2,720,812 | Middleton | Oct. 18, 1955 |
| 2,730,922 | Beard | Jan. 17, 1956 |
| 2,735,017 | Beard et al. | Feb. 14, 1956 |
| 2,750,519 | Summerhayes et al. | June 12, 1956 |
| 2,753,459 | Fedorchak | July 3, 1956 |
| 2,755,703 | Politsch et al. | July 24, 1956 |
| 3,098,565 | Fouse et al. | July 23, 1963 |